US012639274B1

(12) United States Patent　　(10) Patent No.: US 12,639,274 B1
Critsinelis et al.　　(45) Date of Patent: May 26, 2026

(54) AUTOMATED METADATA GENERATION AND NATURAL LANGUAGE DATABASE QUERYING

(71) Applicant: Inventus Holdings, LLC, Juno Beach, FL (US)

(72) Inventors: Dimitri C. Critsinelis, Houston, TX (US); Gunjan Neopaney, Katy, TX (US); Edwyn S. Bougre, West Palm Beach, FL (US); Nishitha Reddy Narreddi, Austin, TX (US)

(73) Assignee: Inventus Holdings, LLC, Juno Beach, FL (US)

( * ) Notice: Subject to any disclaimer, the term of this patent is extended or adjusted under 35 U.S.C. 154(b) by 0 days.

(21) Appl. No.: 19/073,414

(22) Filed: Mar. 7, 2025

(51) Int. Cl.
G06F 16/00 (2019.01)
G06F 16/21 (2019.01)
G06F 16/2452 (2019.01)
G06F 16/25 (2019.01)

(52) U.S. Cl.
CPC ...... G06F 16/212 (2019.01); G06F 16/24522 (2019.01); G06F 16/258 (2019.01)

(58) Field of Classification Search
CPC . G06F 16/212; G06F 16/24522; G06F 16/258
See application file for complete search history.

(56) References Cited

U.S. PATENT DOCUMENTS 8,396,894 B2　3/2013　Jacobson et al.
8,442,982 B2　5/2013　Jacobson et al.

9,244,952 B2　1/2016　Ganti et al.
9,817,891 B1　11/2017　Eksteen et al.
10,095,743 B2　10/2018　Piecko
10,380,113 B2　8/2019　Johnson
(Continued)

FOREIGN PATENT DOCUMENTS

CN　119719131 A　*　3/2025
CN　120181206 B　*　8/2025　............. G06F 16/35

OTHER PUBLICATIONS

Nguyen et al., "Random Sampling for Group By Queries",IEEE, pp. 1-12 (Year: 2020).*

*Primary Examiner* — Alexander Khong
(74) *Attorney, Agent, or Firm* — Fish & Richardson P.C.

(57) ABSTRACT

A machine-readable medium stores instructions that, when executed by a processor, cause the processor to execute operations. The operations include receiving information identifying a database table and preprocessing the table. The preprocessing includes extracting primary and foreign key relationships and generating sample data by combining frequency-based sampling of common values with random sampling. The operations also include generating, using an LLM, a unified metadata schema. The generating includes processing the table and the sample data using domain-specific prompts and outputting the unified metadata schema. The operations include embedding and indexing the unified metadata schema and converting a natural language question output from an end-user device into a SQL query. The converting includes identifying relevant metadata in the unified metadata schema matching query intent and generating the SQL query using the filtered metadata. The operations also include executing the SQL query and providing query results to the end-user device.

20 Claims, 10 Drawing Sheets

(56)        References Cited

U.S. PATENT DOCUMENTS

| | | | | |
|---|---|---|---|---|
| 10,437,847 | B1 * | 10/2019 | Silberstein | .............. G06F 16/26 |
| 10,459,942 | B1 * | 10/2019 | Silberstein | ............ G06F 16/254 |
| 2007/0219943 | A1 | 9/2007 | Draughn, Jr. | |
| 2013/0024430 | A1 * | 1/2013 | Gorelik | .............. G06F 16/2282 |
| | | | | 707/690 |
| 2017/0103099 | A1 * | 4/2017 | Bitar | ..................... G06F 16/284 |
| 2020/0159723 | A1 * | 5/2020 | Goyal | .................... G05B 15/02 |
| 2021/0073207 | A1 | 3/2021 | Dageville et al. | |
| 2024/0248896 | A1 * | 7/2024 | Boskovic | .......... G06F 16/24522 |

* cited by examiner

50

METADATA GEN
MODULE 66

DATA RETRIEVAL
AGENT 74

RETRIEVAL
AUGMENTED
GENERATION
MODULE 70

SERVER 58

DATABASE 54

NETWORK 120

END-USER
DEVICE 62

Figure 4A:
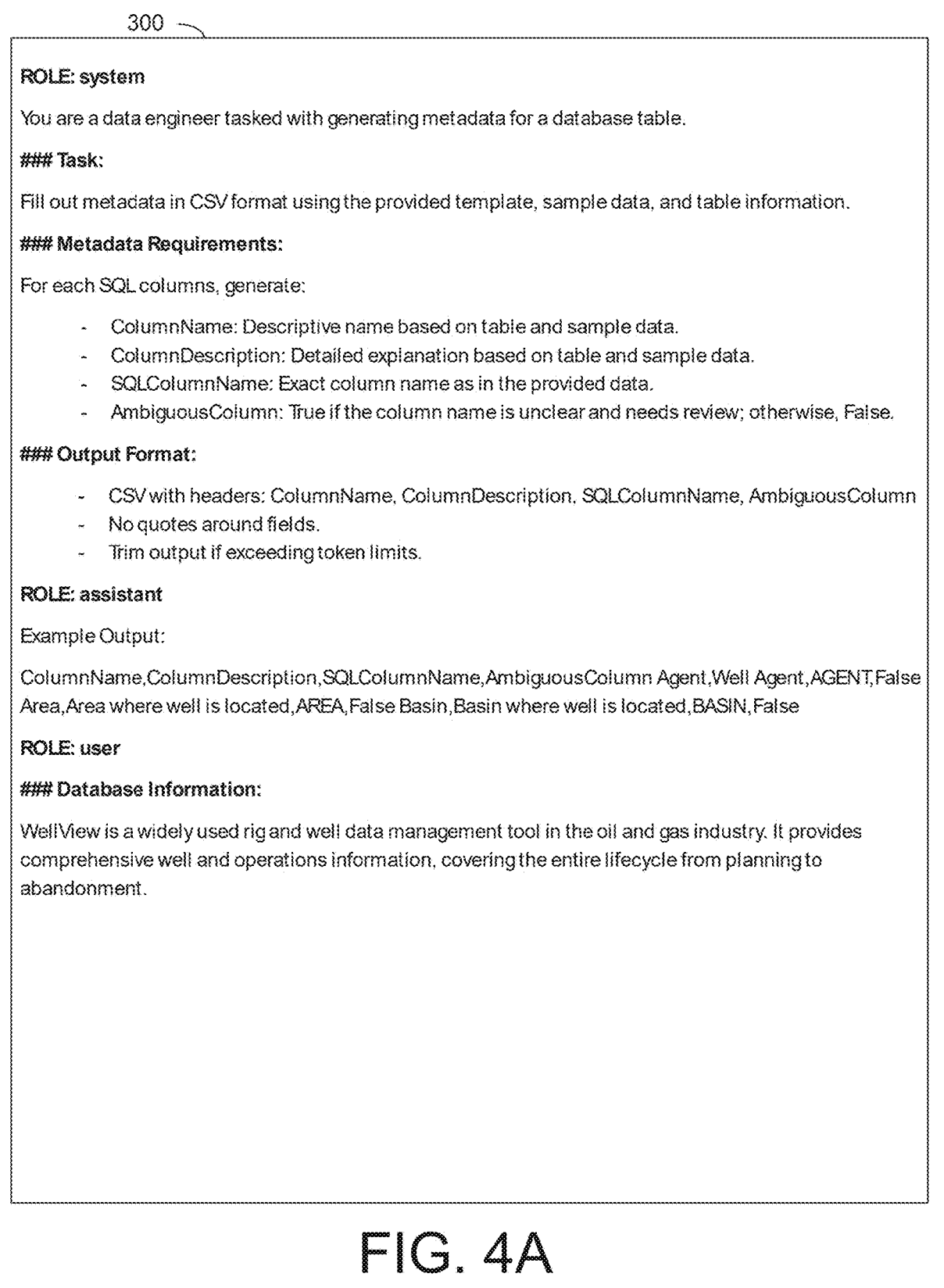

300

ROLE: system

You are a data engineer tasked with generating metadata for a database table.

Task:

Fill out metadata in CSV format using the provided template, sample data, and table information.

Metadata Requirements:

For each SQL columns, generate:

- ColumnName: Descriptive name based on table and sample data.
- ColumnDescription: Detailed explanation based on table and sample data.
- SQLColumnName: Exact column name as in the provided data.
- AmbiguousColumn: True if the column name is unclear and needs review; otherwise, False.

Output Format:

- CSV with headers: ColumnName, ColumnDescription, SQLColumnName, AmbiguousColumn
- No quotes around fields.
- Trim output if exceeding token limits.

ROLE: assistant

Example Output:

ColumnName,ColumnDescription,SQLColumnName,AmbiguousColumn Agent,Well Agent,AGENT,False Area,Area where well is located,AREA,False Basin,Basin where well is located,BASIN,False

ROLE: user

Database Information:

WellView is a widely used rig and well data management tool in the oil and gas industry. It provides comprehensive well and operations information, covering the entire lifecycle from planning to abandonment.

```
Database Table Information:

- Table: SampleTable1

- Table Columns: ColumnName, DataType

AFEAMTCALC,float
AFEAMTNORMCALC,float
AFENUMBERCALC,varchar
AFECOSTTYPCALC,varchar
AFETOTALCALC,float
AFETOTALNORMCALC,float
BHADRILLRUNCALC,float
BHATOTALRUNCALC,float
COSTAFEFORECASTVARCALC,float
COSTFORECASTFIELDVARCALC,float
COSTMAXTOTALCALC,float
COSTMINTOTALCALC,float
COSTMLTOTALCALC,float
COSTMLNOEXCLUDECALC,float
COSTNORMAFEFORECASTVARCALC,float
COSTNORMFORECASTFIELDVARCALC,float
COSTNORMTOTALCALC,float
COSTTECHLIMITTOTALCALC,float
.... (REMOVED FOR BREVITY)
SAFETYINCNOCALC,float
SAFETYINCREPORTNOCALC,float
SUMMARY,varchar
TARGETFORM,varchar
VARIANCEAFEFINALCALC,float
VARIANCEFIELDCALC,float
VARIANCEFIELDFINALCALC,float
VARIANCEFINALCALC,float
VARIANCENORMAFEFINALCALC,float
VARIANCENORMFIELDCALC,float
VARIANCENORMFIELDFINALCALC,float
VARIANCENORMFINALCALC,float
WVTYP,varchar
```

Figure 4C:
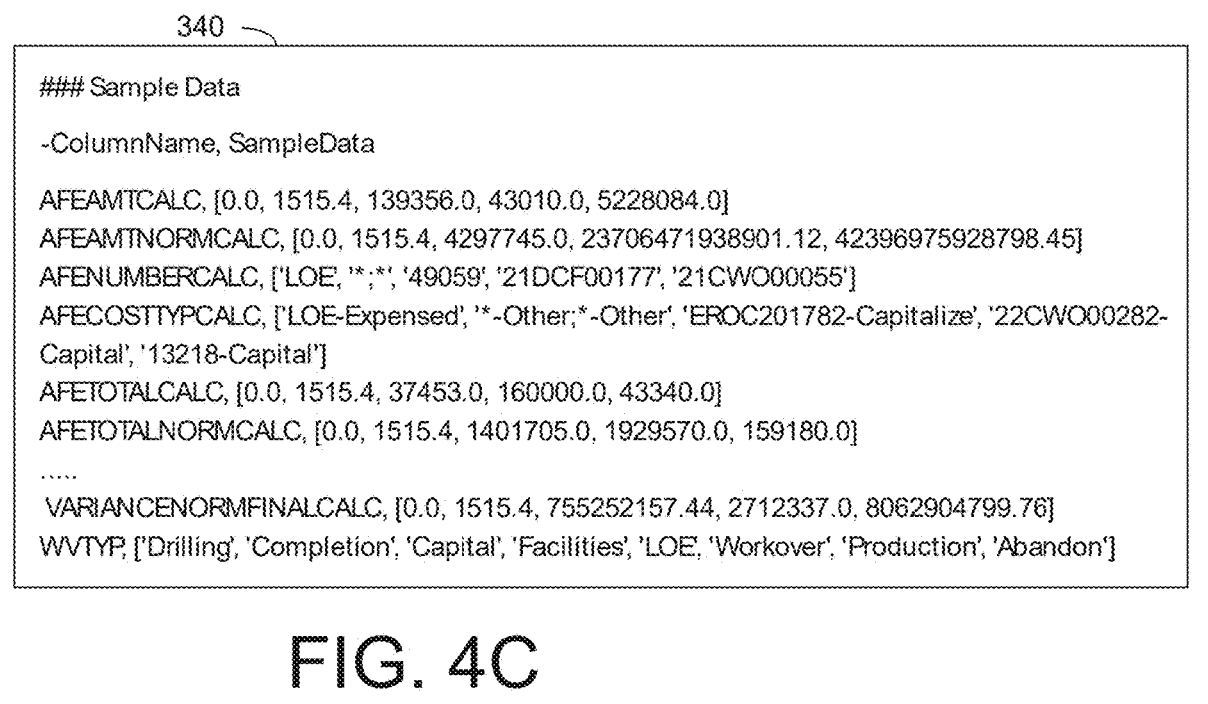

Sample Data

-ColumnName, SampleData

AFEAMTCALC, [0.0, 1515.4, 139356.0, 43010.0, 5228084.0]
AFEAMTNORMCALC, [0.0, 1515.4, 4297745.0, 23706471938901.12, 42396975928798.45]
AFENUMBERCALC, ['LOE', '*;*', '49059', '21DCF00177', '21CWO00055']
AFECOSTTYPCALC, ['LOE-Expensed', '*-Other;*-Other', 'EROC201782-Capitalize', '22CWO00282-Capital', '13218-Capital']
AFETOTALCALC, [0.0, 1515.4, 37453.0, 160000.0, 43340.0]
AFETOTALNORMCALC, [0.0, 1515.4, 1401705.0, 1929570.0, 159180.0]
.....
 VARIANCENORMFINALCALC, [0.0, 1515.4, 755252157.44, 2712337.0, 8062904799.76]
WVTYP, ['Drilling', 'Completion', 'Capital', 'Facilities', 'LOE', 'Workover', 'Production', 'Abandon']

Figure 5A:
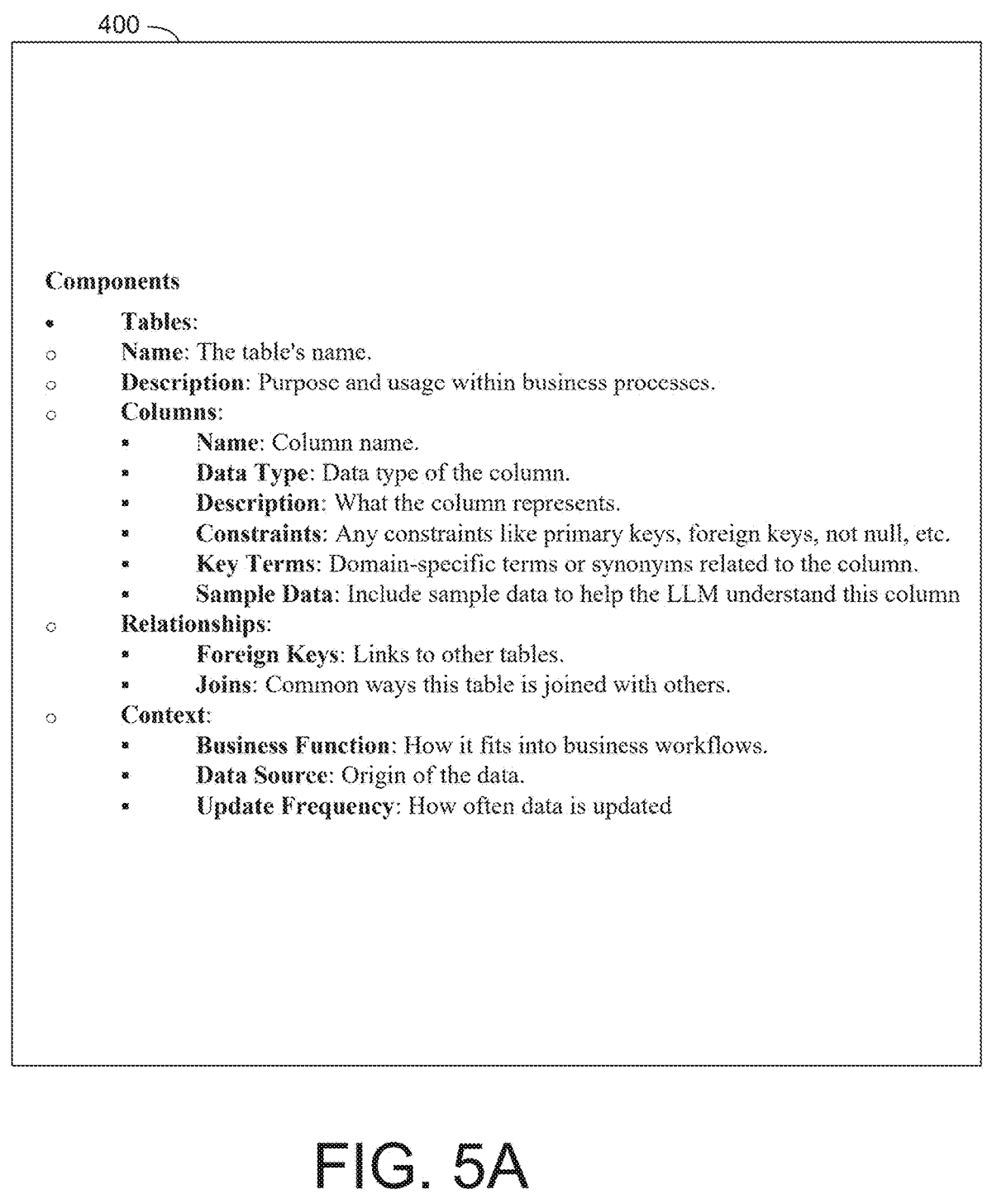

Components

- Tables:
o Name: The table's name.
o Description: Purpose and usage within business processes.
o Columns:
  ▪ Name: Column name.
  ▪ Data Type: Data type of the column.
  ▪ Description: What the column represents.
  ▪ Constraints: Any constraints like primary keys, foreign keys, not null, etc.
  ▪ Key Terms: Domain-specific terms or synonyms related to the column.
  ▪ Sample Data: Include sample data to help the LLM understand this column
o Relationships:
  ▪ Foreign Keys: Links to other tables.
  ▪ Joins: Common ways this table is joined with others.
o Context:
  ▪ Business Function: How it fits into business workflows.
  ▪ Data Source: Origin of the data.
  ▪ Update Frequency: How often data is updated

```
                    Example of Unified Metadata
{
  "tableName": "DrillingOperations",
  "description": "Contains records of drilling activities for upstream oil and gas wells.",
  "businessFunction": "Used by drilling engineers and operations teams to track and optimize
drilling performance.",
  "dataSource": "Captured from real-time rig sensors and daily drilling reports.",
  "updateFrequency": "Real-time with each drilling event.",
  "columns": [
          {
            "columnName": "WellID",
            "dataType": "INTEGER",
            "isPrimaryKey": true,
            "description": "Unique identifier for each well.",
            "keyTerms": ["Well Number", "API Number"],
            "sampleData": ["data 1", "data 2", "data3"]
          },
          {
            "columnName": "RigID",
            "dataType": "INTEGER",
            "description": "Identifier linking to the rig performing the drilling.",
            "keyTerms": ["Rig Number", "Drilling Unit ID"],
            "sampleData": ["data 1", "data 2", "data3"]
          },
          {
            "columnName": "SpudDate",
            "dataType": "DATE",
            "description": "Date and time when drilling commenced.",
            "keyTerms": ["Start Date", "Well Spud Date"],
            "sampleData": ["data 1", "data 2", "data3"]
          }
          // Additional columns...
  ],
  "relationships": [
          {
            "relatedTable": "Rigs",
            "relationType": "Many-to-One",
            "foreignKey": "RigID"
          }
          // Additional relationships...
  ]
}
```

FIG. 5B

| User Question | SQL Query |
|---|---|
| Give me all the wells drilled in the Haynesville drilled within the last three months. | SELECT wellname, AREA, DTTMSPUD<br>FROM WVWELLHEADER wh<br>WHERE wh.area = 'Haynesville'<br>  AND wh.DTTMSPUD >= DATEADD(MONTH, -3, GETDATE()); |
| Give me all the wells drilled in the Haynesville that started producing within the last three months. | SELECT wellname, AREA, DTTMFIRSTPROD<br>FROM WVWELLHEADER wh<br>WHERE wh.area = 'Haynesville'<br>  AND wh.DTTMFIRSTPROD >= DATEADD(MONTH, -3, GETDATE()); |
| In which South Texas county do we have the most producing wells? | SELECT TOP 1 county, COUNT(*) AS producing_well_count<br>FROM WVWELLHEADER<br>WHERE AREA = 'Eagleford' AND CURRENTWELLSTATUS1 = 'Producing'<br>GROUP BY county<br>ORDER BY producing_well_count DESC; |
| In which areas do we operate? | SELECT AREA, COUNT(*) AS well_count<br>FROM WVWELLHEADER<br>where OPERATOR = 'OPERATOR 1'<br>GROUP BY area<br>ORDER BY well_count DESC; |
| How many non-op wells do we have? | SELECT COUNT(*) AS well_count<br>FROM WVWELLHEADER<br>where OPERATOR != 'OPERATOR 1'<br>ORDER BY well_count DESC; |
| Which wells have we drilled that are at least 23,000 feet? | SELECT wellname, AREA, TDCALC<br>FROM WVWELLHEADER wh<br>WHERE TDCALC >= 23000 |
| Provide me the 10 wells which were drilled with the most BHA runs in the HVL. | SELECT TOP 10 wellname, AREA, BHATotalRunCalc<br>FROM WVWELLHEADER wh<br>JOIN WVJOB wj ON wh.IDWELL = wj.IDWELL<br>WHERE wh.AREA = 'Haynesville'<br>  AND WVTYP = 'Drilling'<br>  AND wellname NOT LIKE '%pad%'<br>ORDER BY BHATotalRunCalc DESC; |
| Give me the 3 most costly wells for us. | SELECT TOP 3 wh.wellname, wh.area,<br>FORMAT(SUM(wj.costtotalcalc), 'C') AS total_cost<br>FROM wvwellheader wh<br>JOIN wvjob wj ON wh.IDWELL = wj.IDWELL<br>GROUP BY wh.wellname, wh.area<br>ORDER BY SUM(wj.costtotalcalc) DESC; |
| Split the cost of Well 36 by job type. | SELECT wh.wellname, wj.jobtyp, FORMAT(SUM(wj.costtotalcalc), 'C') AS total_cost<br>FROM wvwellheader wh<br>JOIN wvjob wj ON wh.IDWELL = wj.IDWELL<br>WHERE wh.wellname = 'WELL 36'<br>GROUP BY wh.wellname, wj.jobtyp<br>ORDER BY SUM(wj.costtotalcalc) DESC; |

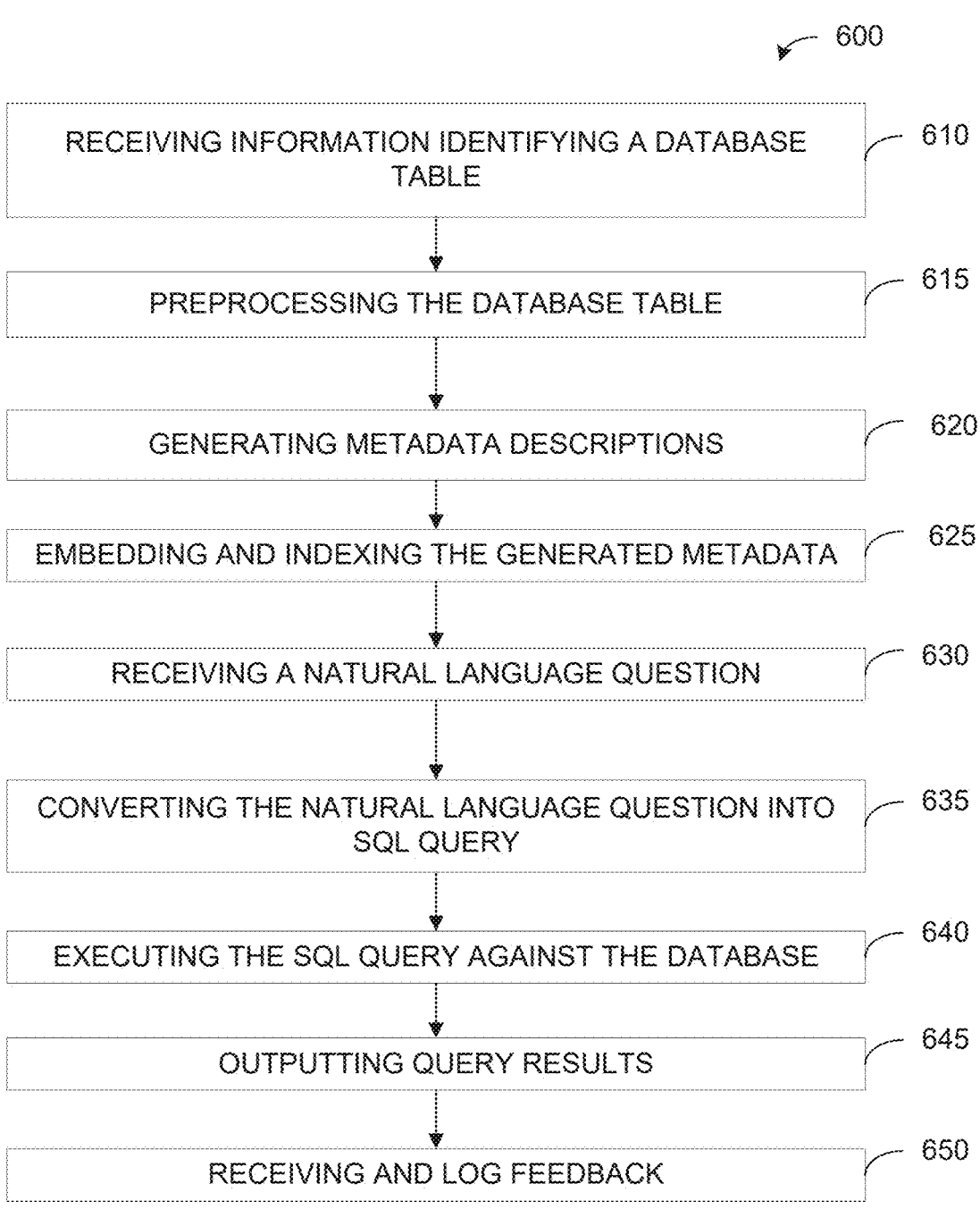

600

RECEIVING INFORMATION IDENTIFYING A DATABASE TABLE — 610

PREPROCESSING THE DATABASE TABLE — 615

GENERATING METADATA DESCRIPTIONS — 620

EMBEDDING AND INDEXING THE GENERATED METADATA — 625

RECEIVING A NATURAL LANGUAGE QUESTION — 630

CONVERTING THE NATURAL LANGUAGE QUESTION INTO SQL QUERY — 635

EXECUTING THE SQL QUERY AGAINST THE DATABASE — 640

OUTPUTTING QUERY RESULTS — 645

RECEIVING AND LOG FEEDBACK — 650

FIG. 7

AUTOMATED METADATA GENERATION AND NATURAL LANGUAGE DATABASE QUERYING

TECHNICAL FIELD

This disclosure relates to converting natural language questions into structure database queries.

BACKGROUND

In large-scale enterprise environments, managing and retrieving data across diverse databases typically relies on several established approaches and technologies. Database management systems incorporate features for metadata management and query tuning. These systems leverage various NLP (natural language processing)-to-SQL research projects and AI (artificial intelligence) technologies to enable database querying through natural language interfaces.

The field of metadata management has evolved to include automated tools for schema extraction and metadata generation. Some solutions employ database introspection capabilities to extract schema details and relationships between tables. Tools and frameworks for maintaining data dictionaries are employed to document table relationships and enable cross-platform interoperability through standardized metadata formats. LLMs (Large Language Models) have emerged as a technology for interpreting natural language and generating appropriate database queries, though these typically operate within predefined schemas and rules.

SUMMARY

A first example relates to a non-transitory machine-readable medium storing instructions that, when executed by a processor, cause the processor to execute operations. The operations include receiving information identifying a database table and preprocessing the database table. The preprocessing includes extracting primary and foreign key relationships and generating sample data by combining frequency-based sampling of most common values with random sampling. The operations also include generating, using an LLM (large language model), a unified meta data schema. The generating of the unified meta data schema includes processing the preprocessed database table and sample data using domain-specific prompts and outputting the unified metadata schema in a standardized format. The operations further include embedding and indexing the unified metadata schema and converting a natural language question output from an end-user device into a SQL (structured query language) query. The converting includes identifying relevant metadata in the unified metadata schema matching query intent using semantic search, filtering and prioritizing metadata based on query relevance and generating the SQL query using the filtered metadata. The operations also include executing the SQL query against the database and providing query results to the end-user device as a response to the natural language question.

A second example relates to a system for automated metadata generation and natural language database querying. The system includes a metadata generation module operating on one or more computing platforms that receives information identifying a database table and preprocesses the database table by extracting primary and foreign key relationships. The metadata generation module also generates balanced sample data by combining frequency-based sampling of most common values with random sampling and generates, using an LLM, a unified meta data schema using domain-specific prompts and outputs the unified metadata schema in a standardized format. The system includes a retrieval augmented generation module operating on the one or more computing platforms that embeds and indexes the unified metadata schema and identifies relevant metadata in the unified metadata schema matching user intent of a question using a semantic search. The retrieval augmented generation module also filters and prioritizes metadata based on query relevance. The system further includes a data retrieval agent operating on the one or more computing platforms that receives a natural language question from an end-user device and converts the natural language question into a SQL query using the filtered metadata. The data retrieval agent also executes the SQL query against the database and provides query results to the end-user device as a response to the natural language question.

A third example relates to a method for automated metadata generation and natural language database querying. The method includes preprocessing, by a metadata generation module operating on one or more computing platforms, a database table. The preprocessing includes extracting primary and foreign key relationships, generating sample data by combining frequency-based sampling of most common values with random sampling. The method also includes generating, using an LLM, a unified meta data schema. The generating includes processing the preprocessed database table and sample data using domain-specific prompts and outputting the unified metadata schema in a standardized format. The method includes embedding and indexing the unified metadata schema with a retrieval augmented generation module operating on the one or more computing platforms and converting, by a data retrieval agent operating on the one or more computing platforms a natural language question provided from an end-user device into an SQL query. The converting includes identifying relevant metadata in the unified metadata schema matching query intent using semantic search and filtering and prioritizing metadata based on query relevance. The converting also includes generating the SQL query using the filtered metadata. The method further includes executing, by the data retrieval agent, the SQL query against the database and outputting, by the data retrieval agent, query results to the end-user device as a response to the natural language question.

BRIEF DESCRIPTION OF THE DRAWINGS

FIGS. 4A-4C illustrates an example of a prompt that is input to an LLM, according to an embodiment of the present invention.

FIG. 5A illustrates an example of a template for a unified metadata schema, according to an embodiment of the present invention.

FIG. 5B illustrates an example of a unified metadata schema for a particular database table of oil/gas operations, according to an embodiment of the present invention.

FIG. 6 is a table that shows examples of natural language questions, with corresponding answers and SQL queries for oil/gas operations, according to an embodiment of the present invention.

FIG. 7 illustrates a flowchart of an example method for converting a natural language question into a SQL query, according to an embodiment of the present invention.

DETAILED DESCRIPTION

This description relates to a system for automated metadata generation and natural language database querying. The system leverages Large Language Models (LLMs) to automatically generate comprehensive metadata descriptions that enable natural language querying of complex enterprise databases by translating natural language questions generated by a user into tuned SQL (structured query language) queries.

The system described in this description includes a metadata generation module that automates the creation of high-quality metadata through preprocessing of database tables, generation of balanced sample data and generation of LLM-based metadata descriptions. The system includes a retrieval augmented generation module that leverages embeddings in the metadata to locate and prioritize relevant metadata that matches user intent of the natural language questions, forming a foundation for accurate SQL query generation. The system includes a data retrieval agent that converts the natural language questions into tuned SQL queries and returns answers to the natural language questions in a specific format.

The system incorporates innovative data preprocessing capabilities to enhance performance. In some examples, the preprocessing includes implementation of the "elbow method" for data filtering, which automatically identifies relevant columns by analyzing data completeness patterns. The modularity of the system enables adaptation across different datasets through standardized metadata schema, semantic search capabilities and structured ambiguity detection that flags terms requiring human validation. This comprehensive approach addresses challenges such as manual metadata management, inefficiencies in data retrieval and rigid query schemas in conventional SQL systems. By automating these processes, the system of the present disclosure ensures high-quality metadata generation and enterprise-wide adaptability.

Figure 1:
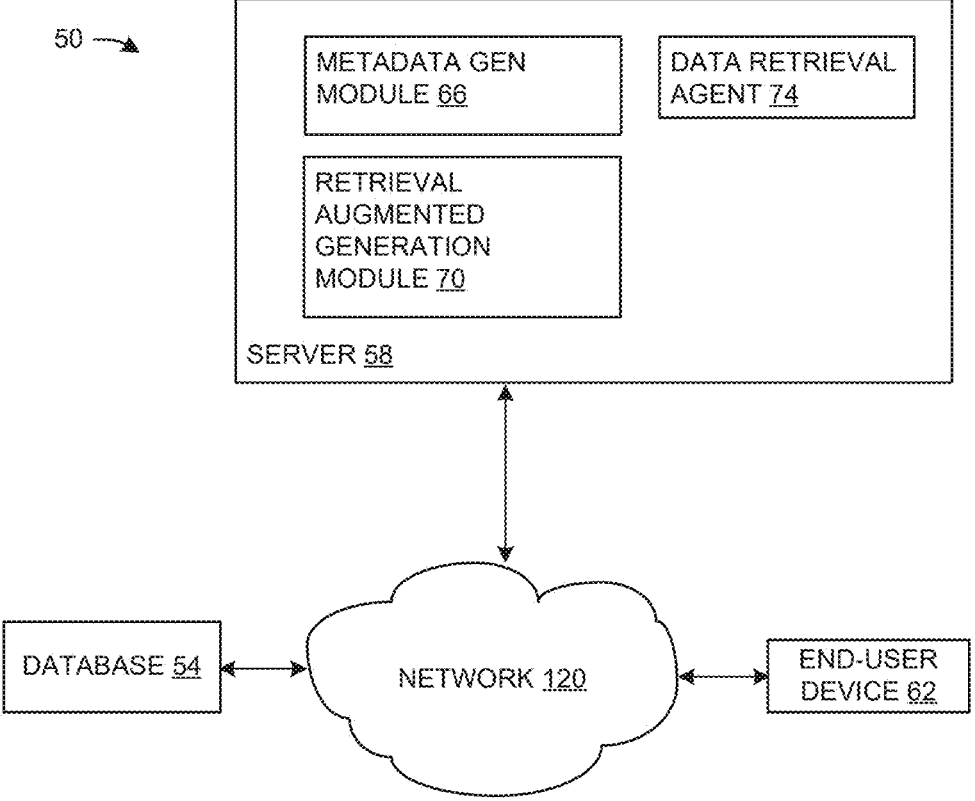
FIG. 1 illustrates an example system for automated metadata generation and natural language database querying, according to an embodiment of the present invention.

FIG. 1 illustrates an example system 50 for automated metadata generation and natural language database querying. The system 50 includes a server 58 that hosts three modules for converting a natural language question to an SQL query, namely, a metadata generation module 66, a data retrieval agent 74 and a retrieval augmented generation module 70. These modules operate in concert to enable natural language querying of database 54 through a network 120 that connects the server 58 to an end-user device 62.

The metadata generation module 66 automates the creation of high-quality metadata by preprocessing database tables, generating balanced sample data and leveraging an LLM to create standardized metadata descriptions. This automated approach reduces the manual effort conventionally needed for metadata creation across enterprise systems and maintains data quality through targeted review.

The retrieval augmented generation module 70 embeds and indexes the generated metadata to enable semantic search capabilities that match user query intent. The retrieval augmented generation module 70 filters and prioritizes relevant metadata to ensure accurate SQL query generation.

The data retrieval agent 74 leverages this filtered metadata to convert natural language questions into tuned SQL queries, making database access more efficient and accessible to non-technical users.

The system 50 communicates over the network 120, which can be a public network, private network or combination thereof. The end-user device 62 provides an interface for users to submit the natural language queries and receive formatted results. This modular architecture enables scalable deployment across different datasets and business units within an enterprise while incorporating continuous improvement through user feedback.

The system 50 provides several advantages over conventional approaches through an innovative combination of automated metadata generation, semantic search capabilities and natural language query processing. In particular, users without experience in crafting SQL queries can input relatively simple natural language questions to execute complex data queries effortlessly to add value to an enterprise. The architecture of the system 50 supports interoperability across platforms while ensuring rich context for LLM interpretation and query precision. This comprehensive approach overcomes traditional limitations of manual metadata creation and query generation while providing a scalable solution for enterprise-wide deployment.

Figure 2:
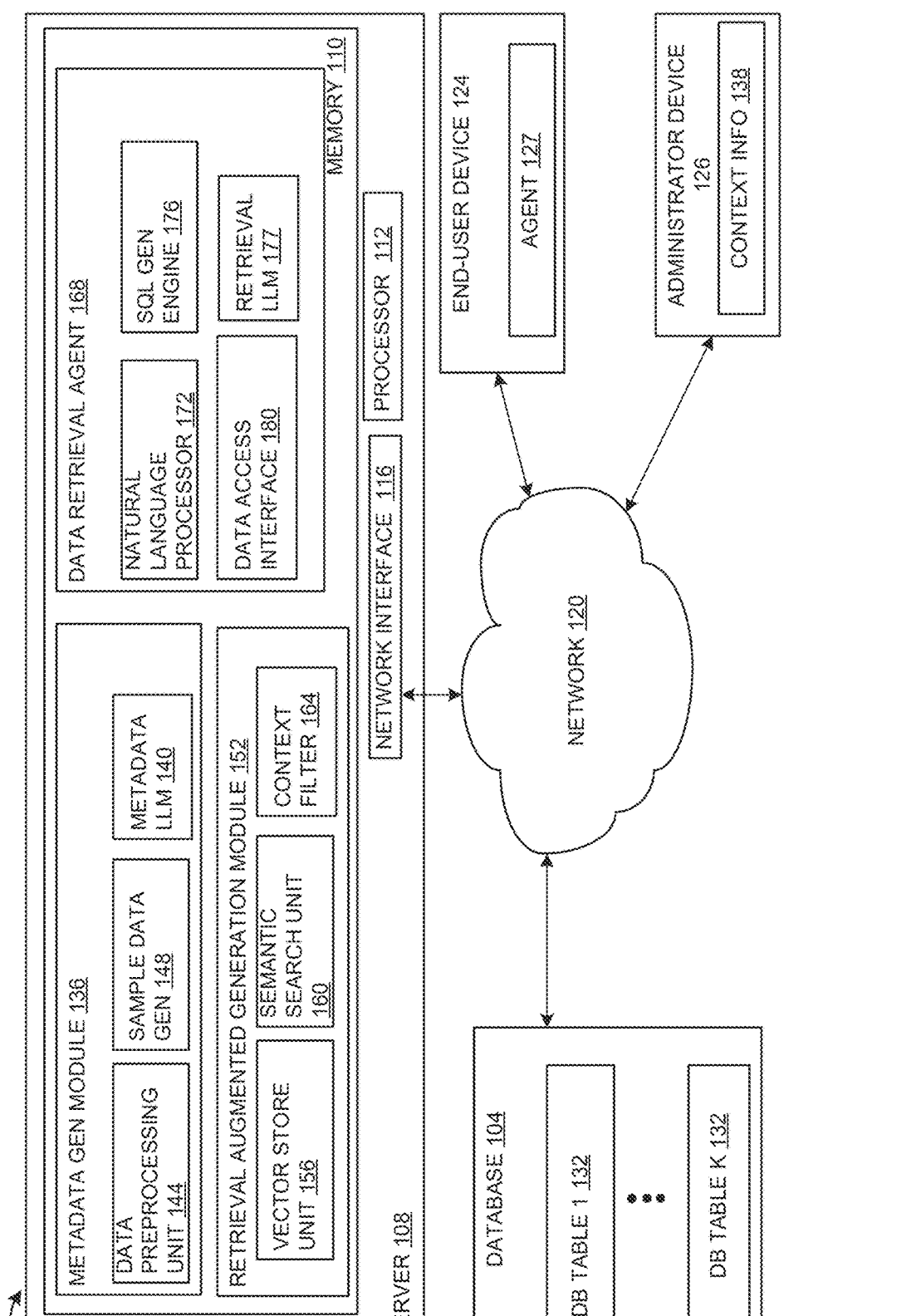
FIG. 2 illustrates another example system for converting natural language questions into queries for a database, according to an embodiment of the present invention.

FIG. 2 illustrates another example system 100 for converting natural language questions into queries for a database 104. The system 100 is employable to implement the system 50 of FIG. 1. The system 100 can include a server 108 (e.g., one or more computing platforms) that can include a memory 110 for storing machine-executable instructions and data and a processor 112 for accessing the memory 110 and executing the machine-executable instructions, causing the processor 112 to perform/execute particular operations. The memory 110 represents a non-transitory machine-readable medium, such as random access memory (RAM), a solid state drive, a hard disk drive or a combination thereof. The processor 112 can be implemented as one or more processor cores. The server 108 can include a network interface 116 (e.g., a network interface card) configured to communicate with other computing platforms via a network 120, such as a public network (e.g., the Internet), a private network (e.g., a local area network (LAN) or a utility network) or a combination thereof (e.g., a virtual private network).

The server 108 could be implemented in a computing cloud. In such a situation, features of the server 108, such as the processor 112, the network interface 116 and the memory 110 could be representative of a single instance of hardware or multiple instances of hardware with applications executing across the multiple of instances (i.e., distributed) of hardware (e.g., computers, routers, memory, processors or a combination thereof). Alternatively, the server 108 could be implemented on a single dedicated server or workstation.

Other computing platforms (e.g., computing devices) of the system 100 also communicate on the network 120. These other computing devices include an end-user device 124, an administrator device 126 and a server for storing and managing access to the database 104. For purposes of simplification of explanation, details of the end-user device 124, the administrator device 126 and other such computing platforms are omitted. However, it is understood that the end-user device 124, the administrator device 126 and the database 104 can be implemented in a similar manner as the server 108. In fact, in some examples, the server 108 and the database 104 are operating on the same computing device. Unless otherwise indicated, it is presumed that the modules of the server 108 and the database 104 are stored in a non-transitory memory that is accessed by a processor (e.g., one or more processing cores). The modules include instructions that when executed by such a processor cause the processor to execute specific operation described herein.

The end-user device 124 includes an agent 127 executing thereon. The agent 127 could be, for example, a web browser or application software (e.g., an app). The agent 127 can be employed by a user to communicate with the server 108.

The database 104 contains K number of database tables 132, labeled "DB TABLE 1 . . . . DB TABLE K", where K is a positive integer. Each of the database tables 132 contained in the database 104 stores data that could, for example, be related to operations for a utility network. In one example, a given database table 132 could be an employee database that includes names, contact information, job role, etc. In another example, a given database table 132 can include data for drilling operations, such as oil & gas well drilling. In such a situation, the given database table 132 could include information such as a name of each well drilled, a date that the well was drilled, parameters of the well (e.g., depth, width, etc.). In yet another example, a given database table 132 could be information related to utility assets, such as information pertaining to feeder lines, transformers, residences, etc. This list is not meant to be exhaustive. In other examples, additional and/or different types of information can be stored in a particular database table.

The memory 110 includes software modules configured to generate metadata that is employable for translation of natural language questions output from the agent 127 (e.g., in response to user input) into search and query (SQL) language queries. More specifically, the memory 110 includes a metadata generation module 136. The metadata generation module 136 automates the creation of high-quality metadata providing descriptions for database tables and columns using a metadata LLM 140 (large language model). The metadata LLM 140 is illustrated as being a constituent component of the metadata generation module 136, but in other examples, the metadata LLM 140 could be external to the metadata generation module 136.

The administrator device 126 can be operated by a user that is assigned an account with administration privileges for the database 104 and the server 108. The administrator device 126 stores context information 138 that identifies a selected set of database tables 132 and includes information identifying user roles. The metadata generation module 136 receives and stores context information 138 that includes the selected set of database tables 132 of the database 104. There can be one or more database tables 132 in the selected set of database tables 132. Responsive to receipt of this portion of the context information 138, the metadata generation module 136 initiates a multi-part operation through a data preprocessing unit 144 and a sample data generator 148. The data preprocessing unit 144 analyzes the selected set of database tables 132 using, for example, an "elbow method" that applies a null threshold filter to identify points of diminishing returns in data completeness, allowing the data preprocessing unit 144 to dynamically remove columns with sparse or missing data to form preprocessed data structures. In some examples, elbow method operations of the preprocessing unit 144 can be omitted.

Figure 3:
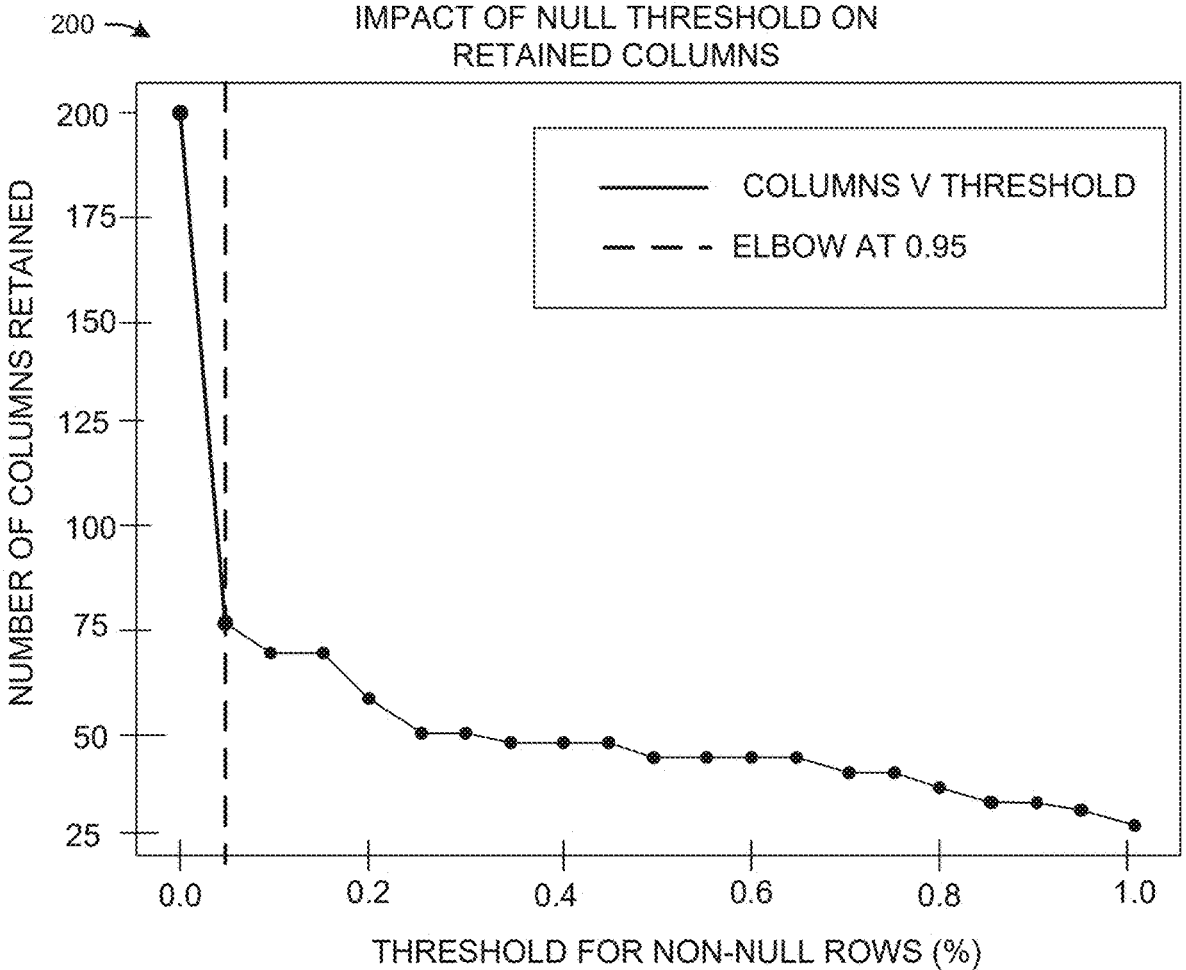
FIG. 3 depicts a graph illustrating the implementation of the elbow method for database preprocessing, according to an embodiment of the present invention.

FIG. 3 depicts a graph 200 illustrating the impact of applying a null threshold filter for selective database table column retention during preprocessing. The graph 200 depicts the impact of implementing the elbow method. The graph 200 shows the relationship between the threshold for non-null rows (x-axis from 0.0 to 1.0) and the number of columns retained (y-axis from 0 to 200). The elbow method identifies a tuned threshold percentage at 95% of null values (e.g., only 5% or less of the column is non-null values), shown by the dashed vertical line, where there is a sharp drop in the number of retained columns from approximately 200 to 75. Accordingly, in the columns represented on the left of the elbow line, 95% or more of the values are null values. Stated differently, in this situation, the number of null values in each column meets or exceeds the threshold percentage of 95% in this example. Thus, these columns are discarded per the elbow method. Moreover, as illustrated, this single threshold percentage of null values enables a discarding of 125 of the 200 columns (e.g., 62.5% of the columns are discarded). Further, the elbow method establishes a point of diminishing returns, such that decreasing the threshold below the threshold of 95% in the present example yields minimal additional column reduction while potentially discarding useful data.

Referring back to FIG. 2, the data preprocessing unit 144 extracts and identifies primary and foreign key relationships between tables of the selected set of database tables while contemporaneously removing unnecessary system administration columns. System administration columns refer to database fields that contain internal system management information rather than business data. System administration columns include system creation dates that track when records were input into the database system and system modification dates that indicate when records were last modified. The data preprocessing unit 144 automatically identifies and removes these system administration columns since the system administration columns are not needed for business queries and removing the system administration columns improves overall system performance. Common examples of system administration columns that get removed include fields starting with "SYS" prefix, creation timestamps, modification timestamps and other internal tracking fields used by the database system rather than storing actual operational data. In other examples, other prefixes can be identified and removed. In many such situations, the particular prefixes selected for removal are database dependent. These columns are filtered out in the preprocessing pipeline before generation of metadata.

The sample data generator 148 creates balanced sample data by combining frequency-based sampling of most common values (e.g., most frequently occurring values) with random sampling to ensure comprehensive data representation, and the sample data generator 148 filters null values to maintain a sufficient number of unique datapoints for LLM processing. In some examples, a combination of frequency-based and random sampling can be split equally (e.g., 50/50), unless frequency-based sampling captures all or nearly all relevant data (e.g., Categorical data). The number of sample data instances can be variable (e.g. 50 rows, 25 rows, etc.). This automated preprocessing and sample generation enables the metadata generation module 136 to efficiently prepare database content for metadata creation and maintains data quality and relevance.

The metadata generation module 136 receives domain-specific prompts that incorporate industry and database-specific context (e.g., for oil/gas operations) that are based on user roles included in the context information 138 from the administrator device 126. The metadata generation module 136 combines the domain-specific prompts, the preprocessed database structures and sample data to form a prompt that is input to the metadata LLM 140. FIGS. 4A-4C illustrates an example of a prompt that is input to the metadata LLM 140.

More specifically, FIG. 4A illustrates a first portion 300 of the prompt that includes text identifying user roles, as well as an output format of information provided in response to a natural language question provided from the agent 127 in response to user input.

FIG. 4B illustrates a second portion 320 of the prompt. The second portion 320 of the prompt lists the columns of the set of selected database tables (e.g., of the database tables 132 of FIG. 2) that have been determined to have relevant data and forms the preprocessed database structures. FIG. 4C includes a third portion 340 of the prompt. The third portion 340 of the prompt includes the sample data. In the example illustrated in FIG. 4C, only a portion of the sample data is shown, but in implementation, each of the columns identified in the second portion 320 (including the columns omitted for brevity) would include sample data.

Referring back to FIG. 2, the metadata LLM 140 processes the prompt, and identifies and flags potentially ambiguous terms requiring human validation (e.g., validation through the administrator device 126), while generating standardized metadata output in a specific format (e.g., CSV (comma separated variable) format) that includes column descriptions, SQL column names and ambiguity flags. The metadata LLM 140 provides the ability to understand intricate language structures and significantly reduce the manual effort required for generating metadata descriptions. This structured approach ensures consistent, high-quality metadata generation while maintaining scalability across different database systems. The metadata LLM 140 processes one table at a time to avoid hallucination issues and incorporates built-in quality controls to validate outputs against database context. The metadata LLM 140 outputs a unified metadata schema.

The unified metadata schema output by the metadata LLM 140 follows a standardized JSON (JavaScript Object Notation) format that combines multiple components for database understanding and query generation. It is noted that JSON is given as one example, and in other examples, the metadata schema can be output in other formats, such as XML (Extensible Markup Language) as well. At the database table level, the schema captures fundamental information including the table name, a description of a purpose and usage of the table within business processes, an origin of a data source for the table and update frequency details. For individual columns, of the database table, the unified metadata schema includes the column name, data type, detailed descriptions of what each column represents, domain-specific key terms and synonyms related to the column. In some examples, the unified metadata schema also includes semantically clean and human readable column names generated from column names. The unified metadata schema also provides representative sample data and any constraints, such as primary or foreign keys. The unified metadata schema documents relationships between tables by specifying related database tables, the nature of relationships (e.g., Many-to-One) and foreign key connections. More generally, the unified metadata schema provides a cohesive metadata framework that combines data dictionaries and table relationships and supports interoperability across platforms, ensuring rich context for LLM interpretation and query precision. The metadata output is structured to enable automated SQL query generation while maintaining the ability to flag ambiguous terms that require human validation through a quality control process.

FIG. 5A illustrates an example of a template 400 for a unified metadata schema. FIG. 5B illustrates an example unified metadata schema 420 for a particular database table for oil/gas operations. In implementation, there can be a unified metadata schema for each table in the selected set of database tables 132 of FIG. 2.

Referring back to FIG. 2, the unified metadata schema is provided to a retrieval augmented generation module 152. The retrieval augmented generation module 152 leverages embeddings in the unified metadata schema to locate and prioritize relevant metadata that matches the intent of user queries, forming a foundation for accurate SQL query generation.

More specifically, the unified metadata schema output by the metadata LLM 140 is provided to the retrieval augmented generation module 152 through a vector store unit 156. The vector store unit 156 embeds and indexes the generated metadata included in the unified metadata schema to enable semantic search capabilities. The retrieval augmented generation module 152 includes a semantic search unit 160 that leverages these embeddings to locate relevant metadata that matches an intent of user questions, forming a foundation for SQL query generation. The retrieval augmented generation module 152 also includes a context filter 164 that prioritizes the metadata based on query relevance to select the appropriate metadata for generating database queries. The context filter 164 outputs filtered and prioritized metadata based on an alignment with a specific query. The filtered metadata is provided to a data retrieval agent 168 stored in the memory 110. The context filter 164 ensures that only relevant metadata matching the user question intent is used for SQL generation, improving query accuracy and performance.

The data retrieval agent 168 converts natural language questions into tuned SQL queries by leveraging metadata to provide contextually relevant database access. The data retrieval agent 168 includes a natural language processor 172, an SQL generation engine 176 and a retrieval LLM 177 to generate tailored database queries. The data retrieval agent 168 further includes a data access interface 180 to execute the generated tailored queries.

More specifically, the natural language processor 172 converts user questions (in natural language form) into SQL queries by leveraging metadata included in the filtered metadata for contextually relevant outputs, while validating query accuracy using metadata context. The SQL generation engine 176 leverages the retrieval LLM 177 to creates tuned database queries using the filtered metadata output from the retrieval augmented generation module 152 and returns error messages rather than hallucinating responses when unable to generate a valid SQL query. The data access interface 180 executes the generated queries against the database 104 and returns formatted results. For purposes of simplification of explanation, the metadata LLM 140 and the retrieval LLM 177 are illustrated as being separate modules. However, in some examples, the metadata LLM 140 and the retrieval LLM 177 are integrated in a single LLM that is tuned to execute multiple functions. In other examples, the metadata LLM 140 and the retrieval LLM 177 are separate, and operate in parallel. Still further, the SQL generation engine 176 can be integrated with the retrieval LLM 177 or vice versa.

The formatted results are output to the agent 127 of the end-user device 124 as responses to the natural language questions. The agent 127 can output the results (e.g., in a display or through an audio output) to users. The data access interface 180 also provides a feedback portal accessible by the agent 127. The feedback portal enables the user of the end-user device 124 to provide feedback (e.g., in response to user input) that characterizes a user response indicating approval or disapproval response (e.g., "thumbs up" and "thumbs down" responses), an answer ranking (e.g., a numerical rating between one and five), etc.

This feedback is logged by the data access interface 180 along with operations of a query execution to track performance and enable continuous improvement of the system 100. When a query fails or returns incorrect results, the data access interface 180 logs this feedback rather than hallucinating responses, allowing the development team to identify areas needing improvement. The feedback is provided to the metadata generation module 136 to enable continuous refinement of both the metadata generation and query processing capabilities. Collecting and incorporating user feedback helps improve query accuracy and performance over time while maintaining system quality.

FIG. 6 is a table 500 that shows examples of natural language questions, with corresponding answers and SQL queries for oil/gas operations. The table 500 is employable for validation against a trained machine learning model. The table 500 is not meant to be exhaustive, but rather to demonstrate a small sample of the types of questions that can be proceeded and answered by the metadata generation module 136, the retrieval augmented generation module 152 and the data retrieval agent 168 operating in concert.

Referring back to FIG. 2, the system 100 provides several advantages over conventional database query approaches. The metadata generation module 136 automates the creation of high-quality metadata through a combination of data preprocessing, balanced sample data generation and LLM-based metadata description. This automated approach reduces the manual effort traditionally required for metadata creation across enterprise systems while maintaining data quality through targeted human review. The retrieval augmented generation module 152 and the data retrieval agent 168 function in tandem to enable natural language querying of the database tables 132 of the database 104 without requiring SQL expertise. By leveraging embedded metadata and semantic search capabilities, the system 100 can accurately interpret user intent of natural language questions provided from the agent 127 and generate optimized SQL queries, making database access more efficient and accessible to non-technical users.

The metadata generation module 136 executes dynamic column selection using, for example, the elbow method for preprocessing, balanced sample data generation combining frequency-based (e.g., most frequently occurring values) and random sampling, and structured ambiguity detection in metadata generation. The metadata generation module 136 and the data retrieval agent 168 also incorporate continuous improvement through user feedback and logging capabilities. This comprehensive approach overcomes conventional approaches that require manual metadata creation and query generation while providing a scalable solution for enterprise-wide deployment.

In view of the foregoing structural and functional features described above, example methods will be better appreciated with reference to FIG. 7. While, for purposes of simplicity of explanation, the example methods of FIG. 7 are shown and described as executing serially, it is to be understood and appreciated that the present examples are not limited by the illustrated order, as some actions could in other examples occur in different orders and/or concurrently from that shown and described herein. Moreover, it is not necessary that all described actions be performed to implement a method. The example methods of FIG. 7 can be implemented as instructions stored in a non-transitory machine-readable medium. The instructions can be accessed by a processing unit and executed to perform the methods disclosed herein.

FIG. 7 illustrates a flowchart of an example method 600 for converting a natural language question into a SQL query. The method 600 can be implemented, for example, by the system 100 of FIG. 2. At block 610, a metadata generation module (e.g., the metadata generation module 136 of FIG. 2) receives information identifying a database table (e.g., a database table 132 of FIG. 2) in a database (or identifying multiple database tables). At block 615, the metadata generation module preprocesses the database table. The preprocessing can include applying the elbow method to reduce the number of columns in the database table that have null values exceeding a threshold level (e.g., 95%). The preprocessing can also include extracting primary and foreign key relationships, removing system administration columns and generating sample data by combining frequency-based sampling of most common values (e.g., most frequently occurring values) with random sampling. The preprocessing includes filtering null values and curtailing duplicate entries.

At block 620, an LLM (e.g., the metadata LLM 140 of FIG. 2) generates metadata descriptions. The generating includes processing the preprocessed database table and sample data using domain-specific prompts and outputting a unified metadata schema in a standardized format.

At block 625, retrieval augmented generation module (e.g., the retrieval augmented generation module 152) embeds and indexes the generated metadata. At block 630, a data retrieval agent receives a natural language question from an end user device (e.g., the end-user device 124 of FIG. 2). At block 635, the data retrieval agent converts the natural language question provided into a SQL query. The converting includes identifying relevant metadata matching query intent using semantic search, filtering and prioritizing metadata based on query relevance and generating optimized SQL using the filtered metadata. At block 640, the data retrieval agent executes the SQL query against the database. At block 645, the data retention agent outputs query results to the end user device as a response to the natural language question.

At block 650, the data retrieval agent receives feedback for the query results generated with user input at the end-user device. The feedback can be approval or disapproval (e.g., thumbs up or thumbs down), a numerical rating or other indicator characterizing a user response. The feedback and a sequence of operations to generate the query results can be stored by the data retrieval agent. Moreover, this feedback can be employed by the metadata generation module and/or the data retrieval agent to update the metadata and/or further tune SQL queries to improve search results provided for natural language questions over time.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element or the equivalent thereof, it should be interpreted to include one or more than one such element, neither requiring nor excluding two or more such elements.

What is claimed is:

1. A non-transitory machine-readable medium storing instructions that, when executed by a processor, cause the processor to execute operations, the operations comprising:
   receiving information identifying a database table;
   preprocessing the database table, the preprocessing comprising:
      extracting primary and foreign key relationships; and
      generating sample data by combining frequency-based sampling of most common values with random sampling;
   generating, using an LLM (large language model), a unified metadata schema, the generating comprising:
      processing the preprocessed database table and the sample data using domain-specific prompts; and
      outputting the unified metadata schema in a standardized format;
   embedding and indexing the unified metadata schema;
   converting a natural language question output from an end-user device into a SQL (structured query language) query, the converting comprising:
      identifying relevant metadata in the unified metadata schema matching query intent using semantic search;
      filtering and prioritizing metadata based on query relevance; and
      generating the SQL query using the filtered metadata;
   executing the SQL query against the database; and
   providing query results to the end-user device as a response to the natural language question.

2. The non-transitory machine-readable medium of claim 1, wherein the operations further comprise logging user feedback and query execution operations to enable improvement in generating the SQL query.

3. The non-transitory machine-readable medium of claim 1, wherein preprocessing the database table comprises applying an elbow method to identify a point of diminishing returns in data completeness at a threshold percentage of non-null values and removing columns having null values meeting or exceeding the threshold percentage.

4. The non-transitory machine-readable medium of claim 1, wherein generating the sample data comprises collecting data points for each column by combining most frequently occurring values with random samples.

5. The non-transitory machine-readable medium of claim 1, wherein the domain-specific prompts incorporate industry and database context information to improve metadata generation accuracy.

6. The non-transitory machine-readable medium of claim 1, wherein the unified metadata schema comprises:
   table name and description;
   column names, data types and descriptions;
   key terms and sample data; and
   table relationships and constraints.

7. The non-transitory machine-readable medium of claim 1, wherein embedding the metadata comprises creating vector representations to enable semantic search capabilities.

8. The non-transitory machine-readable medium of claim 1, wherein converting the natural language question comprises validating query accuracy using metadata context and returning error messages rather than hallucinating responses when unable to generate a valid SQL query.

9. The non-transitory machine-readable medium of claim 1, wherein the operations further comprise processing one database table at a time to curtail hallucinations.

10. A system for automated metadata generation and natural language database querying, comprising:
   a metadata generation module operating on one or more computing platforms that:
      receives information identifying a database table;
      preprocesses the database table by extracting primary and foreign key relationships;
      generates balanced sample data by combining frequency-based sampling of most common values with random sampling; and
      generates, using an LLM (large language model), a unified metadata schema using domain-specific prompts and outputs the unified metadata schema in a standardized format;
   a retrieval augmented generation module operating on the one or more computing platforms that:
      embeds and indexes the unified metadata schema;
      identifies relevant metadata in the unified metadata schema matching user intent of a question using a semantic search; and
      filters and prioritizes metadata based on query relevance;
   a data retrieval agent operating on the one or more computing platforms that:
      receives a natural language question from an end-user device; and
      converts the natural language question into a SQL (structured query language) query using the filtered metadata;
      executes the SQL query against the database; and
      provides query results to the end-user device as a response to the natural language question.

11. The system of claim 10, wherein preprocessing the database table comprises applying an elbow method to identify a point of diminishing returns in data completeness at a threshold percentage of non-null values and removing columns having null values meeting or exceeding the threshold percentage.

12. The system of claim 10, wherein generating the balanced sample data comprises data points for each column by combining most frequently occurring values with random samples.

13. The system of claim 10, wherein the unified metadata schema comprises table name and description, column names and data types, key terms and sample data and table relationships and constraints.

14. The system of claim 10, wherein the metadata generation module processes one database table at a time to avoid hallucinations.

15. The system of claim 10, wherein the data retrieval agent validates query accuracy using metadata context and returns an error when unable to generate a valid SQL query.

16. The system of claim 10, wherein the data retrieval agent further logs user feedback and query execution operation, wherein the user feedback characterizes approval or disapproval ratings for answers to natural language questions.

17. The system of claim 10, wherein the domain-specific prompts incorporate industry and database context information to improve metadata generation accuracy.

18. A method for automated metadata generation and natural language database querying, comprising:

preprocessing, by a metadata generation module operating on one or more computing platforms, a database table, the preprocessing comprising:

extracting primary and foreign key relationships; and generating sample data by combining frequency-based sampling of most common values with random sampling; and generating, using an LLM (large language model), a unified metadata schema, wherein the generating comprises:

processing the preprocessed database table and the sample data using domain-specific prompts; and outputting the unified metadata schema in a standardized format;

embedding and indexing the unified metadata schema with a retrieval augmented generation module operating on the one or more computing platforms;

converting, by a data retrieval agent operating on the one or more computing platforms a natural language question provided from an end-user device into an SQL (structured query language) query, wherein the converting comprises:

identifying relevant metadata in the unified metadata schema matching query intent using semantic search;

filtering and prioritizing metadata based on query relevance; and generating the SQL query using the filtered metadata;

executing, by the data retrieval agent the SQL query against the database; and outputting, by the data retrieval agent, query results to the end-user device as a response to the natural language question.

19. The method of claim 18, wherein preprocessing the database table comprises:

analyzing data completeness patterns using an elbow method to identify a set of columns that have at least a threshold percentage of null values;

removing the set of columns that having null values meeting or exceeding the threshold percentage; and collecting data points for each retained column by combining most frequently occurring values with random samples.

20. The method of claim 18, wherein generating the unified metadata schema comprises:

incorporating table name, description and business function;

documenting column names, data types, descriptions and constraints;

specifying relationships between tables and foreign key connections;

storing the metadata in JSON format to support interoperability across platforms; and processing one database table at a time to curtail hallucination.

\* \* \* \* \*